Nov. 24, 1942.  C. J. BASSLER  2,302,831
FLUID METER HAVING A THERMOSTATIC DEVICE
Original Filed Jan. 26, 1937
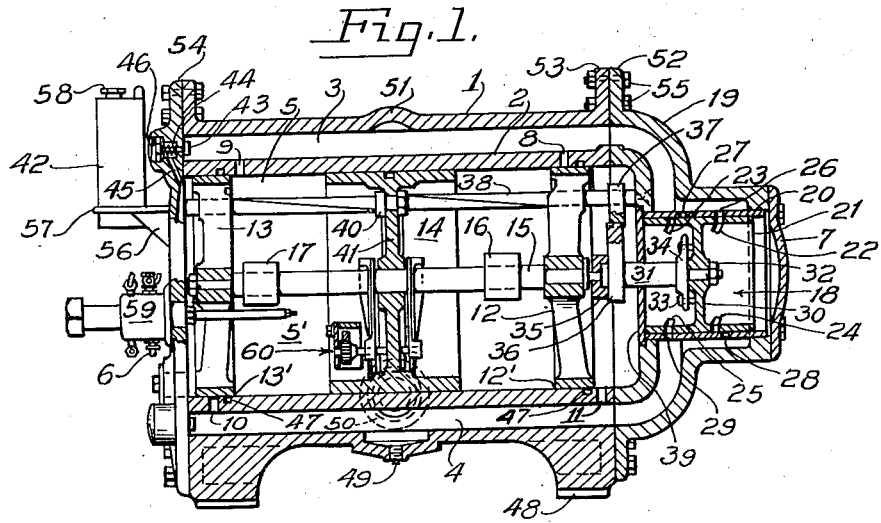
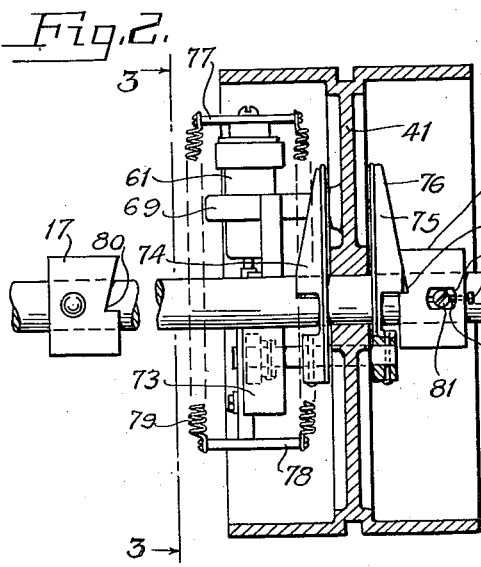
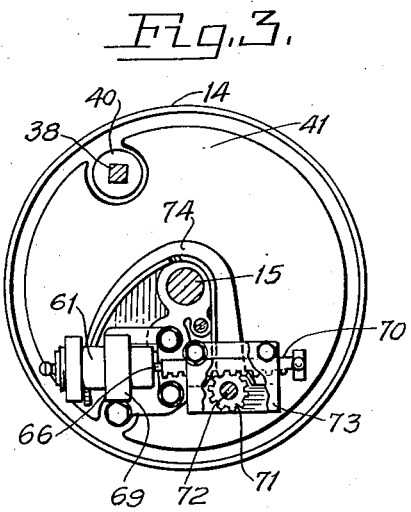
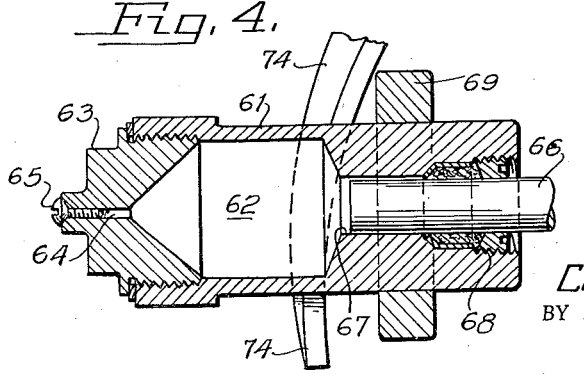
INVENTOR.
Carlos J. Bassler
BY Earl E. Moore
ATTORNEY.

Patented Nov. 24, 1942

2,302,831

UNITED STATES PATENT OFFICE 2,302,831

FLUID METER HAVING A THERMOSTATIC DEVICE

Carlos J. Bassler, Alhambra, Calif., assignor, by mesne assignments, to Bank of America National Trust and Savings Association, Los Angeles, Calif.

Original application January 26, 1937, Serial No. 122,445, now Patent No. 2,217,855, dated October 15, 1940. Divided and this application September 3, 1940, Serial No. 355,163. In Canada April 1, 1940

8 Claims. (Cl. 73—250)

This application is a division of application filed January 26, 1937, bearing Serial Number 122,445, now Patent No. 2,217,855, dated October 15, 1940.

The metering of fluids produced by oil wells involves more than merely measuring by volume, for volume alone means little to the industry. Oil, like other liquids, changes its volume with changes in temperature and, unless this be taken into account, the true volume of the oil and hence its value is not known. Oil volumes are generally reckoned at 60° Fahrenheit and since this is the usual temperature at which metering values are determined, it is very desirous that meters totalize or indicate the measurement of the oil at 60° Fahrenheit volume. So many gallons or barrels of oil at 60° Fahrenheit, or any other temperature, has a definite meaning to the industry, and, a meter which can automatically compensate for temperature differences so as to avoid mathematics and possible human error and time, would be of great value to the oil industry. This is true whether the liquids being measured are from a flowing oil well or from some other source.

In no sense is this invention to be considered as limited to the measurement of oil, for it is within the scope of this invention to include the measuring of any liquid whether alone or mixed with other liquids or mixed with gases and solids.

An object of this invention is to determine the true measurement of liquids.

It is also an object of the invention to accomplish by means the true measurement of liquids as of a predetermined temperature.

A still further object is to ascertain the true measurement of liquids while compensating for volumetric differences due to the temperature of the liquid.

For purposes of illustration and disclosure of this invention so that one skilled in the art can make and operate same, drawing is presented with specifications describing at least one form in which the invention can be practiced, but, it is understood, that this disclosure is not a limiting factor except as limited by the depending claims.

In the drawing:

Fig. 1 shows a longitudinal cross section of a meter embodying the invention,

Fig. 2 shows the invention in enlarged plan view and as applied to the piston of the meter, the piston being shown in section.

Fig. 3 is an elevational view of Fig. 2 taken substantially on the line 3—3 thereof, but illustrated on a slightly smaller scale; parts are broken away for the sake of clarity.

Fig. 4 is an enlarged sectional view of a part of the invention.

The meter section shown in Fig. 1 is substantially the same as applicant's meter shown in Patent #1,905,549 issued April 25, 1933, and Patent #1,886,364 granted November 8, 1932. It comprises inner and outer concentric casings 1 and 2 respectively, spaced from one another to provide passages 3 and 4 for the flow of the mixture to and from the meter chamber 5. Removable end plates 6 and 7 are provided to close the chamber and completely house the internal parts of the meter. Inlet ports 8 and 9 and outlet ports 10 and 11 are controlled by shiftable valve elements 12 and 13. A piston 14 reciprocates in the chamber 5 by the force of the flowing oil mixture through the chamber 5 and freely slides upon the guide rod 15 which is fixed to the valve elements 12 and 13. Adjustable stops 16 and 17 are fixed on the guide rod and are forced toward the ends of the chamber 5 by the piston, and when forced toward an end of the chamber, the stops force the valve elements 12 and 13 in a common direction to either open or close their respective ports 8, 9, 10 and 11.

In order to carry the piston 14 over a dead center or inactive valve position, and assure reversal of the piston, an auxiliary piston and valve assembly is provided at 18. In order to provide a housing for the auxiliary piston, the outer meter casing 1 has a protruded hub-like portion 19 in which is a ported annular partition 20, forming a cylinder and a sliding surface for an inner ported sleeve 21. The sleeve 21 has two inlet ports 22 and 23 and outlet ports 24 and 25. The partition has inlet ports 26 and 27 and outlet ports 28 and 29. The ports of the sleeve and partition are so arranged that one set of inlet and outlet ports on either side of a web 30 will register so as to admit the mixture under pressure from passage 3 to one side of the web and release the mixture on the other side of the web to be free to flow into the passage 4. This being necessary in order to move the web 30 in either direction and force the valves elements 12 and 13 in either direction to carry them over the dead center. A shaft 31, threaded at its end is fixed to the center of the web 30 by a lock nut 32. Pins 33 fixed to the web fit loosely in the slotted ends of a cross-arm member 34. The member 34 is rigidly fixed to the shaft 31 so that it will turn with the shaft and turn web 30 so as to open and close the valved ports in partition 20. The other end of the shaft is journalled or mounted in a common coupler 35 which is fixed to an end of the guide rod 15 so that the rod 15 and shaft 31 translate together. A segment-gear 36 fixed to shaft 31 slides in a meshed relation with a segment-gear 37 which is fixed to a polygonal and spiral shaft 38 to be presently described. Through the rocking of shaft 38, gear 37 will turn the gear 36, shaft 31 and sleeve 21 to a limited degree and cause registration and unregistration of certain ports in the sleeve and partition. A partition 39 divides the auxiliary piston chamber from the metering chamber 5.

A bushing 40 in the web 41 of the piston is internally grooved to fit and slide along the spiral shaft 38 and turn it so as to operate the sleeve valve 18 and an indicating instrument 42 through a chain of gears not shown. Indicating devices are well known and no attempt will be made here to describe any particular indicating device. Such an indicating instrument, however, has a dial section where the number of volumetric units of mixture passed through the meter are totalized and readable.

To release excess liquid and prevent a liquid jamb from behind the piston 14 when on dead center at the left end of the meter of Fig. 1, a small relief plunger 43 is employed. An adjustable resilient means 44 permits the plunger to move upon a predetermined pressure in chamber 5 and thus relieve the chamber side 5' of sufficient pressure to permit the shaft 15 to freely enter said chamber and to completely open or close said ports 9, 11 and 8 and 10, respectively. A passage 45 conducts the mixture to the plunger to relieve pressure in chamber 5'. A removable cap 46 may be provided to gain access to the plunger chamber. The element 43 is a check valve and is urged to closed position by the spring 44, the valve normally remains closed.

Open annular grooves 47 are provided in the casing 2 about the periphery of the valve elements 12 and 13. The purpose of these grooves is to equalize the mixture pressure about the valve surfaces and prevent binding and thus assure smooth and efficient operation of the meter.

The valve surfaces 12' and 13' about the perimeter of the valve elements 12 and 13 are not continuous so as to fit closely against the cylinder wall 2 at all points. Portions of the perimeter are receded so as to reduce friction and also to permit oil to reach the grooves 47. The portions of the valve elements which do have sliding friction with the cylinder walls require lubrication, and it has been found in practice advantageous to equalize the lubricant pressure about all surfaces of the valves where there is sliding friction so as to prevent binding and assure free operation. The meter is provided with feet 48 and a drain 49. The outlet of the meter is shown in dotted lines at 50 and the inlet at the bulge 51. Heavy flanges 52, 53 and 54 join parts 19, 1 and 6 of the outer casing and are securely held together by numerous bolts 55. A bracket 56 supports a shelf 57 which holds the indicator 42 in a position for easy access to a totalizing device beneath the cover 58.

A sampler 59 is mounted upon one end of the meter for periodically depositing samples of the mixture passing through the metering system. A detailed explanation will not be made of the sampler. See parent application for details thereof.

The temperature compensating device 60 shown in the drawing figures comprises a thermostat 61 which is composed of a block having a chamber 62 closed by a cap 63. The cap 63 is threaded so as to be removable for placing fluid in the chamber 62. The fluid is placed in the chamber 62 when said chamber is in an upright position, so that it can be completely filled before the cap 63 is screwed down. A vent 64 is provided in the cap and is closed by a screw 65. When the chamber 62 is loaded with the fluid, the screw 65 is removed before the cap is screwed down. The vent 64 permits the air to escape and thus allows the complete filling of the chamber with the fluid. The fluid is generally the oil being measured. This has been found the most satisfactory and expedient means in practice. When it is certain that the chamber is completely filled with the fluid, the screw 65 is screwed into the vent.

At the other end of the thermostat is a plunger 66 which reciprocates in a bore 67 of the thermostat block. The bore being enlarged at 68 to permit of the usual packing and gland members to prevent escape of the oil from the chamber 62. An annular flange-like bracket 69 is provided to hold the thermostat onto the web 41 of the piston. The plunger 66 is fixed to a rack 70 which is meshed to a pinion gear 71 which, in turn, is fixed to a shaft 72 having one end journalled in a side wall of the housing 73 and a section near the other end journalled in the web 41, of the piston. On both sides of the piston web are two curved radial arms 74 and 75 of the form shown in the drawing. One side of the arms is mitered or tapered at 76 for a purpose to be presently disclosed.

At the outer extreme ends of the thermostat and rack assembly are provided cross arms 77 and 78. Springs 79 connect the ends of the cross arms as shown so as to urge cross arm 78 and rack 70 and the plunger 66 toward the thermostat chamber so that whenever the fluid in chamber 62 contracts, the rack 70 will be retracted, and through the pinion gear 71, place radial arms 74 and 75 in the position shown in Fig. 2. The stops 16 and 17 upon the shaft 15 are recessed and mitered or tapered as shown at 80 to receive the tapered surface 76 of the radial arms. A threaded bolt 81 is held in a threaded bore of the shaft 15 and can be tightly screwed down when the stop is correctly positioned. The stop 16 is adjustable along the shaft 15 by unscrewing the bolt 81 which is slidable in the stop slot 82. The screw head is counter-sunk in the slot 83 of the stop. An adjustable screw 84 pivotally attached to bolt 81 is threaded in the stop 16 and may be turned so as to move the stop axially along the shaft 15. The purpose of moving the stop 16 is to set it at the proper point so that the valves will open and close at the proper time, this feature providing a micro-adjustment. In other words, to shorten the stroke of the piston, the screw 81 is loosened so that the head thereof will ride in the slot 83 when the stop 16 is moved to the left, Fig. 2, by turning the micro-adjustment screw 84 in a clockwise direction. After the stop is positioned, the screw or bolt 81 is tightened. Reverse rotation of the screw 84 allows the stop to be shoved to the right when the screw 81 is loose. The purpose of the tapered surfaces 76 is to vary the amount of the piston displacement in the cylinder 5. The amount of displacement depends upon the temperature of the mixture being measured, and the position of the mitered surfaces 76 of the arms 74 and 75. It can be seen, therefore, that the position of the sliding surfaces 76 will depend upon the temperature of the fluid in chamber 62 of the thermostat which in turn will depend upon the temperature of the oil mixture being measured. Note that the contacting surfaces, of the arms and their respective stop elements, are of large area and which provides for dependable smooth operation over a wide range of fluid temperatures.

Operation

The oil mixture under pressure will enter the manifold passage 3 of the meter and pass through the opening 9 and by its pressure, force the piston 14 toward the right as shown in Fig. 1.

The piston will move until the boss of the radial arm 75 engages the stop 16. This translation of the piston 14 will, by virtue of the bushing 40, turn the spiral shaft 38, which, in turn, will rock the gears 36 and 37 to open valve port 27 to permit the mixture to enter the chamber to the left of the web 30 and force the web 30, shaft 31 and guide rod 15 to the right. The mixture-pressure will, therefore, urge the pistons 14 and 18 in the same direction, to the right as shown in Fig. 1, and their combined effort will be of sufficient order to readily switch the valve element 12 and 13 to the right and reverse the operation of the meter. This combined effort takes place when the piston 14 pushes the stop 16 toward the right with the aid of the piston 18 which is, at the same time, urged toward the right by the fluid pressure to the left of the web 30. Shafts 15 and 31 are coupled together; therefore, movement of either the stops or the web 30 must shift both shafts together as a single element. The coupling or socket 35 permits the two shafts to relatively turn with respect to each other upon their axes to a limited degree. When opening 23 registers with 27 to permit entry of the mixture to one side of web 30, valve port 24 will be opened to permit mixture to the right of web 30 to pass out of its chamber and into the outlet manifold 4 and thence to the outlet 50 toward the yard line. The mixture-force applied against the web 30 aids the force applied to the left of the piston web 41 to carry the valve elements 12 and 13 past their respective dead center positions so as to close inlet port 9 and outlet port 11 and open ports 8 and 10 so as to allow the mixture to force the piston web 41 to the left. When this complete operation has taken place, the spiral shaft 38 has caused the indicating, in the instrument 42, of the volume necessary to displace the piston web 14 in its stroke from left to right. The volumes may be indicated in gallons or barrels.

Upon the open of ports 8 and 10, the mixture will enter the chamber to the right of the web 41 and urge it to the left until the boss of the radial arm 74 engages the stop 17. At this point, the web 30 of the auxiliary piston had been rotated sufficient to open the ports 22—26 and 25—29 so that the mixture-pressure in the chamber to the right of the web 30 will aid the pressure to the right of the web 41 and together, their combined pressure will urge the stop 17 to the left and force the closing of ports 8 and 10 and the opening of the ports 9 and 11 to cause reverse operation of the meter.

The plunger 43 is provided to make room for the excess liquid to the left of the web 41 caused by the shaft 15 when it is forced to the left end of the meter. This is in order to prevent a liquid jamb.

In order to indicate the volumes of the mixture as of a predetermined temperature, preferably 60° Fahrenheit, some of the oil to be measured has been placed in the thermostat chamber 62 while at a temperature of 60° Fahrenheit and of a sufficient quantity to completely fill the chamber. This oil will contract and expand in direct proportion to the contraction and expansion of the mixture being metered. Therefore, if the mixture being metered happens to be warmer than 60° Fahrenheit, the liquid in chamber 62 will expand forcing the plunger 66 and rack 70 to the right, turning the gear 71 clockwise and likewise the radial arms 74 and 75. This will permit the piston web 41 to be further displaced than it would have been had the radial arms remained as shown in Fig. 2, the displacement being in direct proportion to the increase in volume of the liquid over its volume at 60° Fahrenheit, and the boss of the radial arm 75 riding downwardly upon the mitered surface 80 of the stops, as shown in Fig. 2. In Fig. 2, however, the maximum downward position of the arms 74 and 75 are shown.

Should the oil being measured be cooler than 60° Fahrenheit, the reverse action as described above, would take place making the stroke of the piston web 41 shorter instead of longer in direct proportion to the temperature difference between 60° F. and the temperature of the mixture being measured.

Having thus described my invention, what is claimed as new and desired to be secured by Letters Patent is:

1. In a metering device for fluids including a casing having a flow chamber and an indicator to show the volumes of fluid passed through the chamber, a piston in the chamber reciprocated by the flow of fluid through the chamber, a piston shaft, a stop element fixed to the shaft on each side of the piston and spaced therefrom, temperature responsive means fixed to the piston in the chamber and having an arm adjustable intermediate the piston and one of the stop elements to vary the stroke of the piston in accordance to the temperature of the fluid, valve means connected to the shaft to cause reversal motion of the piston, and mechanism connected to the piston and the indicator for operating it.

2. The device set forth in claim 1 wherein one of the stop elements has recessed biased portions for engagement with the arm and provides large area contact between the arm and said one of the stop elements.

3. In a meter for measuring liquids having a volume indicator and a flow chamber with a reciprocable piston therein, a shaft for the piston, means coupled with the piston for operating the indicator, and thermostatic means in the chamber responsive to temperature changes of the liquid being measured for controlling the length of the piston stroke, a stop element adjustably fixed on the shaft, said thermostatic means including a casing having a plunger and a chamber filled with an expansive fluid adapted to shift the plunger, and an arm curvilinearly shiftable intermediate the piston and stop element, and rotary means coupling the plunger of the thermostatic means with the arm to move it, said arm having a long taper and said element an oblique surface to coact with the taper of the arm, valves in the chamber for reversing the flow of liquid therethrough and the direction of the piston, and mechanism to shift the valves.

4. In a meter for measuring liquids having a volume indicator and a flow chamber with a reciprocable piston therein, means coupled with the piston for operating the indicator, and means in the chamber responsive to temperature changes of the liquid being measured for controlling the length of the piston stroke, said means comprising a casing carried by the piston and having a chamber filled with an expansive fluid, a bore in the casing having a plunger reciprocable by the fluid, a rack fixed to the plunger and extending from the casing, radial arms adjacent the piston having a common shaft, a pinion gear fixed to the shaft and meshed with the rack so that reciprocating movement of the plunger and rack will reciprocate the arms, valves in the chamber to cause reversal of the piston, and means operative by the piston to shift the valves.

5. In a meter for measuring liquids having a volume indicator and a flow chamber with a reciprocable piston therein, means coupled with the piston for operating the indicator, valve means coupled with the piston to control flow of liquid through the chamber, and means supported by the piston responsive to temperature changes of the liquid being measured for controlling the length of the piston stroke, the latter means including radial tapered arms which move at right angles to the motion of the piston, a shaft for the piston having spaced apart stops fixed thereto to engage the arms.

6. In a metering device for fluids including a casing having a flow chamber and an indicator to show the volumes of fluid passed through the chamber, a piston in the chamber reciprocated by the flow of fluid through the chamber, a piston shaft, a stop element fixed to the shaft on each side of the piston and spaced therefrom, temperature responsive means fixed to the piston in the chamber and having an arm adjustable intermediate the piston and one of the stop elements to vary the stroke of the piston in accordance to the temperature of the fluid, valve means connected to the shaft to cause reversal motion of the piston, and mechanism connected to the piston and the indicator for operating it, said arm having a tapered portion designed to vary the space action between the piston and said one of the stop elements.

7. In a metering device for fluids including a casing having a flow chamber and an indicator to show the volumes of fluid passed through the chamber, a shaft in the chamber, a piston slidable on the shaft in the chamber and reciprocated by the flow of fluid through the chamber, and spiral means connecting the piston with the indicator, a stop element on each side of the piston and spaced therefrom and fixed to the shaft, temperature responsive means in the chamber supported by the piston, said means having arms adjustable intermediate the piston and the stop elements to vary the stroke of the piston in accordance to the temperature of the fluid, the arms having long tapered portions and each stop element having a recessed oblique for engagement with its respective arm, valves for causing reciprocation of the piston, and mechanism operative by the piston to operate the valves.

8. In a meter for measuring liquids having a volume indicator and a flow chamber with a reciprocable piston therein, rod means coupled with the piston for operating the indicator, and means in the chamber fixed to the piston responsive to temperature changes of the liquid being measured for controlling the length of the piston stroke, a stop element in the chamber, said temperature responsive means including a casing having a plunger and a chamber filled with an expansive fluid, adapted to shift the plunger, and an arm curvilinearly shiftable intermediate the piston and stop element, and rotary means coupling the plunger with the arm to move it, valves to reverse the direction of the piston, and mechanism operated by the piston to shift the valves.

CARLOS J. BASSLER.